United States Patent [19]

Tang et al.

[11] Patent Number: 5,240,690
[45] Date of Patent: Aug. 31, 1993

[54] METHOD OF REMOVING NH3 AND HCN FROM AND FCC REGENERATOR OFF GAS

[75] Inventors: Harry S. Tang, Walnut Creek, Calif.; Gregory L. Johnson, Houston, Tex.

[73] Assignee: Shell Oil Company, Houston, Tex.

[21] Appl. No.: 873,267

[22] Filed: Apr. 24, 1992

[51] Int. Cl.$^5$ .......................... C01C 3/00; C10G 11/00
[52] U.S. Cl. .................................... 423/236; 423/237; 208/113
[58] Field of Search ................. 423/235, 235 D, 236, 423/238, 239, 239 A, 237; 208/113

[56] References Cited

U.S. PATENT DOCUMENTS

| | | | |
|---|---|---|---|
| 3,812,236 | 5/1974 | Adams et al. | 423/237 |
| 4,170,550 | 10/1979 | Kamody | 423/236 |
| 4,325,833 | 4/1982 | Scott | 252/417 |
| 4,435,282 | 3/1984 | Bertolacini et al. | 208/113 |
| 4,744,962 | 5/1988 | Johnson et al. | 423/235 |
| 4,851,374 | 7/1989 | Yan et al. | 502/42 |
| 4,853,187 | 8/1989 | Herbst et al. | 422/144 |
| 4,868,144 | 9/1989 | Herbst et al. | 502/43 |
| 5,173,278 | 12/1992 | Marles et al. | 423/236 X |

*Primary Examiner*—Gregory A. Heller
*Attorney, Agent, or Firm*—Kimbley L. Muller

[57] ABSTRACT

A method is disclosed for the addition of an oxygen-containing gas under certain defined process conditions, to an off-gas stream derived from an FCC regenerator which is operated in a partial mode of combustion. The off-gas from the regenerator contains 1–6% CO by volume and at least 300 ppm nitrogen compounds comprising $NH_3$ and HCN. Without the addition of an oxygen-containing gas, roughly 25 percent of the $NH_3$ and HCN are converted to $NO_x$ in downstream CO boilers. A preferable method of this invention comprises the addition of heated air (20% $O_2$) into the regenerator off gas to produce an off gas stream having a temperature of 1260° F. to 1500° F.

9 Claims, 2 Drawing Sheets

METHOD OF REMOVING NH3 AND HCN FROM AND FCC REGENERATOR OFF GAS

FIELD OF THE INVENTION

This invention relates to a method of removing or reducing the $NO_x$ levels in a flue gas generated by an FCC regenerator operated in an incomplete mode of combustion. In such systems, it is necessary to provide a combustion zone for conversion of CO to $CO_2$. If ammonia or other similar nitrogen containing compounds, such as HCN, are present in the feed material to the combustion zone, $NO_x$ will be formed by oxidation and combustion of the CO.

The field of this invention is also concerned with the control of ammonia or other similar nitrogen containing compounds, including HCN, in a FCC regenerator off gas where the regenerator is operated in an incomplete mode of combustion. This invention is a means to comply with air pollution standards without resort to capital expenditures or to the addition of other components harmful to catalysts or hydrocarbon product. This invention also reduces $NO_x$ levels without the addition of urea to the CO boiler unit.

BACKGROUND OF THE INVENTION

Older, more established FCC regeneration units are operated in an incomplete mode of combustion defined by a CO content of from 1 to 6 volume percent. Substantially complete combustion of coke on an FCC molecular sieve catalyst is disclosed in Bertolacini et al U.S. Pat. No. 4,435,282. This exemplifies the type of system where the quantity of CO content is usually less than 500 ppm. The gaseous effluent from such a regeneration unit has a low CO content and a high $CO_2$ content.

A multi-stage process to reduce $NO_x$ in a flue gas is disclosed in Herbst et al U.S. Pat. No. 4,868,144 (1989) in which $NO_x$ formed in a multiple stage regeneration is converted to nitrogen prior to discharge by operating the downstream end of each regeneration stage at oxygen-lean conditions. In effect, the oxygen concentration in these ranges is sufficiently low to shift the equilibrium to convert $NO_x$ produced during the regeneration to nitrogen. See also U.S. Pat. No. 4,853,187 (1989). A two-stage method of regeneration is disclosed in Yan et al, U.S. Pat. No. 4,851,374 (1989) in which a second fluidizing gas such as air is added to the second stage to regenerate the catalyst. Such addition provides rapid regeneration of the catalyst, suppression of $SO_x$ in the presence of a $NO_x$ transfer agent and substantially complete burning of CO to $CO_2$. The gaseous environment of the second stage, however, favors excessive concentration of $NO_x$. Since most of the nitrogen compounds are destroyed in the first stage, a lower overall content of CO, $NO_x$ and $SO_x$ are achieved through the two-stage regeneration system. A three-stage catalyst regeneration system is provided in Scott U.S. Pat. No. 4,325,833 (1982) where the problem is recognized that some types of cracking operations increase $NO_x$ content of the flue gas. Additional oxygen is added to the regeneration system to convert coke and oxygen to carbon monoxide resulting in a substantially oxygen-free atmosphere. Nitrogen oxides contained in the regeneration gas are reacted to form free nitrogen in the oxygen-free atmosphere so that the amount of nitrogen oxide in the regeneration gas is substantially reduced.

Finally, in Johnson et al, U. S. Pat. No. 4,744,962 a problem of $NO_x$ concentration in an off gas from an incomplete mode of regeneration is solved by the addition of $NO_x$ itself to either the regeneration off gas or to the regenerator itself. The addition of the $NO_x$ reduces the amount of ammonia in the off gas stream thereby changing the feed to the CO combustor to eliminate the production of $NO_x$ in the CO combustor.

OBJECTS AND EMBODIMENTS

It is an object of this invention to address the problem of $NO_x$ reduction in an off gas stream from a regenerator operating in a partial mode of combustion by the addition of oxygen to reduce ammonia content and similar nitrogen compounds such as HCN.

It is further object of this invention to provide the addition of oxygen to a stream containing nitrogen compounds, including $NH_3$ and HCN, to form nitrogen and $NO_x$ from the nitrogen compounds, prior to passage to an oxidation or combustion zone.

Another object of this invention resides in a means to reduce the $NO_x$ content of an effluent stream containing greater than one percent by volume CO by the addition of an oxygen-containing gas, preferably air, at specific temperature conditions to maximize the conversion of nitrogen compounds contained in the stream to elemental nitrogen.

It is another object of this invention to provide a method to reduce the quantity of $NO_x$ from a CO boiler by eliminating the amount, or reducing the amount, of ammonia and other nitrogen compounds, such as HCN, charged to the CO boiler.

One embodiment of this invention resides in a process for the reduction in the amount of nitrogen compounds comprising $NH_3$ and HCN present in a regeneration off gas stream, wherein the regeneration off gas stream is derived from a regenerator operating in a partial mode of combustion to produce the nitrogen containing compounds and at least 1% CO in said stream, by adding to said stream a predetermined amount of an oxygen-containing gas to produce a gas stream having a temperature of 1260° F. to 1500° F. for a period of time sufficient to convert the nitrogen compounds to $NO_x$ and $N_2$.

Yet another embodiment of this invention resides in a process for the reduction in the amount of HCN and $NH_3$ present in a regeneration off gas stream, wherein the regeneration off gas stream is derived from a regenerator operating in a partial mode of combustion to produce $NH_3$ and at least 1% CO in said stream with a predetermined amount of an oxygen-containing gas to provide a combined stream having a temperature of 1260° F. to 1500° F. for a period of time sufficient to convert $NH_3$ and HCN to $NO_x$ and $N_2$.

Yet another embodiment of this invention resides in a process for the regeneration of a catalytic cracking catalyst in a regeneration zone operated at regeneration conditions sufficient to result in 1] a partial mode of regeneration defined by a CO content greater than 1% CO and 2] a regeneration off gas containing $NH_3$ and HCN, the improvement which comprises adding a predetermined amount of a heated oxygen-containing gas to said off gas to produce a gas stream having a temperature of about 1260° F. to about 1500° F. sufficient to convert said $NH_3$ and HCN to $NO_x$ and $N_2$.

BRIEF DESCRIPTION OF THE INVENTION

This invention is concerned with a reduction of nitrogen compounds comprising ammonia ($NH_3$) and hydrogen cyanide (HCN) in an off gas derived from a fluidized catalytic cracking regeneration zone operated in a partial mode of combustion by adding an amount of oxygen or air to produce specific temperature conditions in the off gas stream. It has been discovered that certain "windows of opportunity" based on the temperature of the off gas stream combined with the air are available to add the heated oxygen or air to advantageously reduce the amount of $NH_3$ and HCN prior to charge of the off gas stream to a CO boiler in which any $NH_3$ and HCN present in the off gas stream would be converted by combustion to $NO_x$.

DETAILED DESCRIPTION OF THE INVENTION

When hydrocarbon material is cracked to hydrocarbon material of shorter chain length, coke is produced as a by-product. In catalytic cracking, the coke forms a deposit on the cracking catalyst which necessitates regeneration of the cracking catalyst.

This regeneration is normally associated with burning the coke on the catalyst in an oxygen atmosphere. After coke has been removed from the surface of the catalyst, the catalyst is returned to an FCC riser reactor to process other hydrocarbon materials to produce shorter hydrocarbon chains. The conversion of the coke on the surface of the burning catalyst results in formation of CO. The formation of CO in this manner is temperature dependent. If the temperature in the regenerator becomes hot enough, CO will convert to $CO_2$ in the presence of a sufficient amount of oxygen. In older FCC regeneration units, the CO is not immediately converted to $CO_2$, but instead must be converted to $CO_2$ in a subsequent downstream unit. This unfortunately has the disadvantage of forming $NO_x$ if nitrogen compounds, including $NH_3$ and HCN, are present in the feed gas to the CO combustion unit.

When the FCC regenerator is operated in a partial mode of combustion as much as 6000 ppm (or even more) ammonia and HCN can be present in the gaseous feed to the CO boiler. In addition, one to six percent CO is also present in the regeneration environment. Depending upon combustion conditions in the CO boiler, roughly 25 percent of the nitrogen compounds are converted to $NO_x$ which is then subsequently emitted to the atmosphere unless very expensive scrubbing systems are employed to eliminate the $NO_x$.

The method of this invention utilizes an oxygen-containing gas, preferably air, and most preferably pre-heated air, as an injection gas into the regenerator exit flue gas to produce a gas mixture temperature of between 1000° F. and 1600° F. and preferably between 1260° F. and 1500° F. This temperature may also be controlled by the reaction of CO with $O_2$ depending on the quantity of air added to the off gas stream. Depending upon the regeneration zone operating conditions, as much as up to 94 percent of the ammonia and/or HCN contained in the regeneration off gas can be converted into elemental nitrogen prior to entering the CO boilers by the use of this invention.

This invention is derivative of the discovery of the existence of certain temperature dependent "windows of opportunity" which exist in processing the flue gas stream. During these "windows of opportunity" the removal or conversion of ammonia is very effective. The variables of the "windows of opportunity" are the gas temperature, the amount of oxygen-containing gas charged to the off gas stream and the concentration of $CO_2$, CO and nitrogen compounds in the off-gas stream. The instant process addition results in short-term increase in $NO_x$ in the regenerator gas, but reduced $NO_x$ emissions from the CO boiler.

When a regenerator is operated in a total mode of combustion, the resultant exit gas typically contains 0.5 percent oxygen, 1250 ppm CO and 110 ppm $NO_x$ with little or no ammonia. Roughly half of this $NO_x$ remains unchanged in CO boilers even if the CO boilers are necessary to complete the process. This provides a system which emits a smaller amount of $NO_x$ to the atmosphere in comparison to a regeneration system using an incomplete mode of combustion in which $NO_x$ is formed in the CO boilers which are essential to a process operated in an incomplete mode of combustion.

The "windows of opportunity" for the addition of the oxygen-containing gas are shown in the examples and the illustrative embodiments which follow. The amount of oxygen-containing gas will vary depending upon the concentration of the oxygen in the gas. Air, preferably pre-heated air, is added to the regenerator off gas. The amount of pre-heated air is adjusted to give the desired final off gas temperature of 1260° to 1500° F. to maximize the conversion of $NH_3$ and HCN to elemental nitrogen without substantially increasing the amount of $NO_x$. This process actually reduces the amount of $NO_x$ in the process gas emitted to the environment. The advantage of this invention is the overall reduction in $NO_x$ content, even though the added oxygen results in a larger amount of $NO_x$ in the off gas stream prior to entry of the off-gas stream to the CO boiler.

The CO boiler is operated at conditions comprising a temperature of 1400° F. to about 2500° F. in order to ensure complete conversion of CO to $CO_2$. Unfortunately, under these conditions, if $NH_3$, HCN or other nitrogen compounds are present in the off gas stream charged to the CO boiler, approximately 25 percent of the nitrogen compounds are converted to $NO_x$ which will then be emitted to the atmosphere absent very expensive scrubbing to remove the $NO_x$.

DETAILED DESCRIPTION OF THE DRAWINGS

Figure 1:
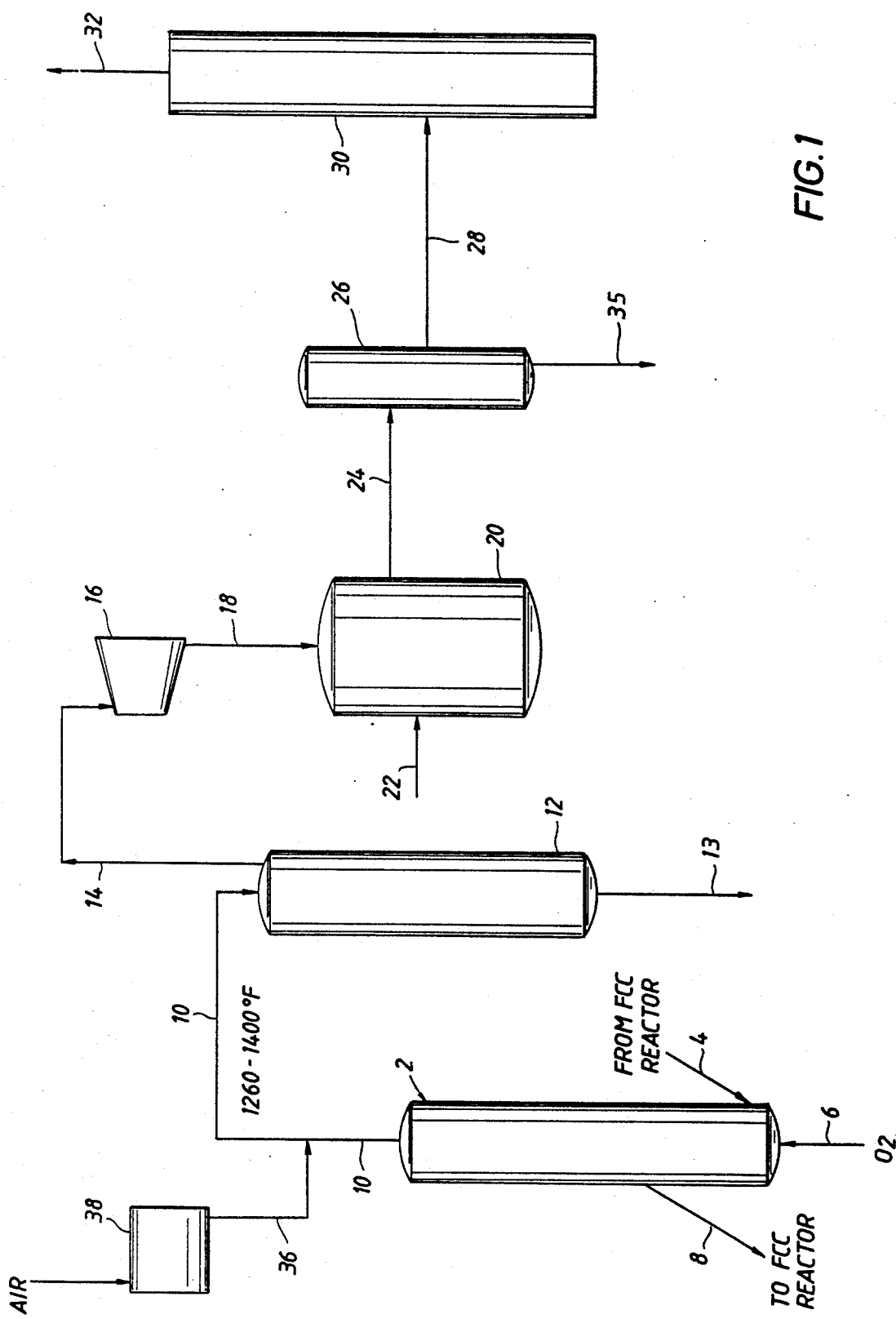
FIG. 1 is a schematic process diagram of the method of this invention.

In FIG. 1, an FCC reactor is operated to produce a spent catalytic cracking catalyst having carbon deposited on the surface of the catalyst. This spent catalyst is passed from the FCC reactor in conduit (4) to regenerator (2) to burn the carbon off the surface of the catalyst.

The oxidation of the coke on the catalyst occurs in the presence of an oxygen-containing gas added to the regenerator through conduit (6). After regeneration, the catalyst is returned to the FCC reactor through conduit (8). The temperature conditions of the regenerator off gas (10) can be as high as 1400° F. and as low as 1150° F. when the regenerator is maintained in a partial mode of combustion which is defined by a regeneration off gas having more than 1000 ppm CO and at least 300 ppm ammonia (or related nitrogen compounds such as HCN) present in the off gas. The off gas is removed from regenerator (2) through conduit (10). Air is preheated in preheater (38) and passed in cominglement with the regeneration off gas in conduit (10) via conduit (36). It is important that this regeneration off gas/preheated air mixture result in a final temperature between 1260° to 1400° F. to maximize the reduction in ammonia and other nitrogen compounds as a result of by the addition of the oxygen. It is recognized that a certain number of catalyst fines may be present in stream (10). Accordingly, the reaction to form the $NO_x$ from the oxygen addition may be accelerated as much as 100 percent in the presence of those fines.

Admixture (10) is passed to separation means (12) for the removal of catalyst fines. This catalyst removal can be made through horizontal or vertical cyclone separators. The removed catalyst particles are withdrawn from the process through conduit (13). Recovered gas is removed from separation means (12) in conduit (14) and passed to turbine power recovery unit (16) to maximize the amount of power recovered from the refinery stream possessing relatively high temperatures. After power has been recovered from stream (14), the cold or cooler gas is removed via conduit (18) and passed to the combustion zone (20) in which oxygen (for combustion of CO to $CO_2$) is added to combustion zone (20) through conduit (22). Any CO present in stream (18) is converted to $CO_2$ in combustion zone (20). The reduction in the amount of ammonia and other nitrogen compounds in stream (18) is based on the addition of a proper amount of air added via conduit (36). Combustion zone effluent is removed from combustion zone (20) in conduit (24) and passed to electrostatic precipitator (26) which is operated to remove any indigenous catalyst fines. The ultimate gaseous process effluent is passed to the atmosphere through gas stack (30) and conduit (32) while solids are removed through conduit (35).

The addition of air via conduit (36) to off gas stream (10) should be in a quantity sufficient to cause a final temperature of 1260° to 1400° F. This addition, at these temperatures, results in a significant reduction in the amount of $NO_x$ emitted in conduit (32).

ILLUSTRATIVE EMBODIMENTS

Figure 2:
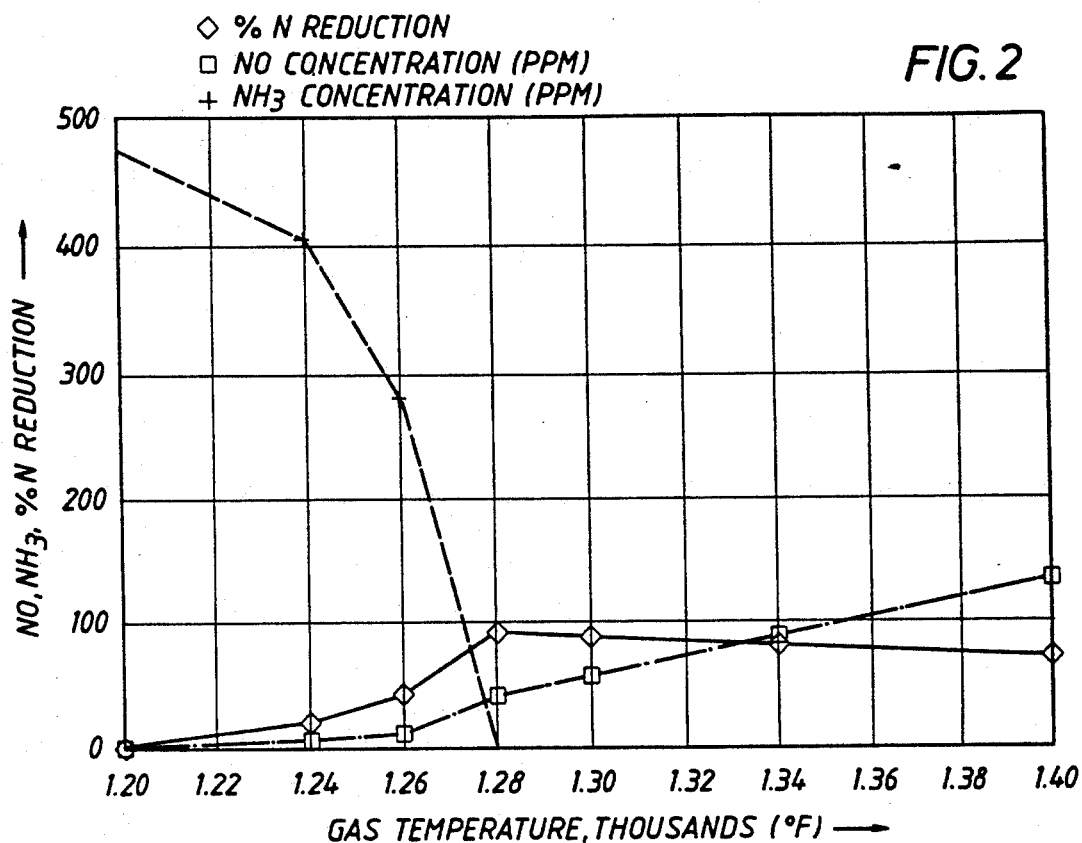
FIG. 2 is a graph to show the effect of temperature on ammonia reduction in an off gas of a FCC regeneration unit operated in a partial mode of combustion.

The effect of varying the amount of injected air versus temperature is shown in FIG. 2. FIG. 2 is based upon calculations and is, therefore, a theoretical prediction. The initial composition contains 1.5 percent oxygen, 3 percent carbon monoxide and 500 ppm $NH_3$. The initial mixture condition of 12000° F. and 1.0% oxygen results in a reduction in ammonia from 500 ppm to 6 ppm while only producing 28 ppm $NO_x$ from the initial gas composition. FIG. 2 shows that the optimal temperature window is between 1280° F. and 1340° F. With this temperature/composition window, percent nitrogen compound reduction to $N_2$ is achieved between 80 and 90 percent.

An experiment was performed to simulate the addition of an oxygenated stream to the duct that connects the regenerator t the CO boiler (or other furnace) where residual CO gas is burned to $CO_2$.

The experiments were performed in 2 cm diameter quartz reactor tubes filled with quartz beads to provide plug flow. The tube length and reactant flow rates allowed about 0.3 seconds residence time at specific temperatures. The tube was placed in a vertical furnace to provide a nearly isothermal environment for the experiment. The experimental studies focused on partial combustion conditions so reacting gases were simulated with a mixture of 4.5 percent CO, 20 percent water vapor, 75 percent nitrogen and variable amounts of ammonia. The reactor tube was supplied with a separate line to supply air. Air and the gas stream were allowed to mix at the reactor entrance. The initial oxygen content, after mixing, and before reaction was in the range of 0-1%.

Figure 3:
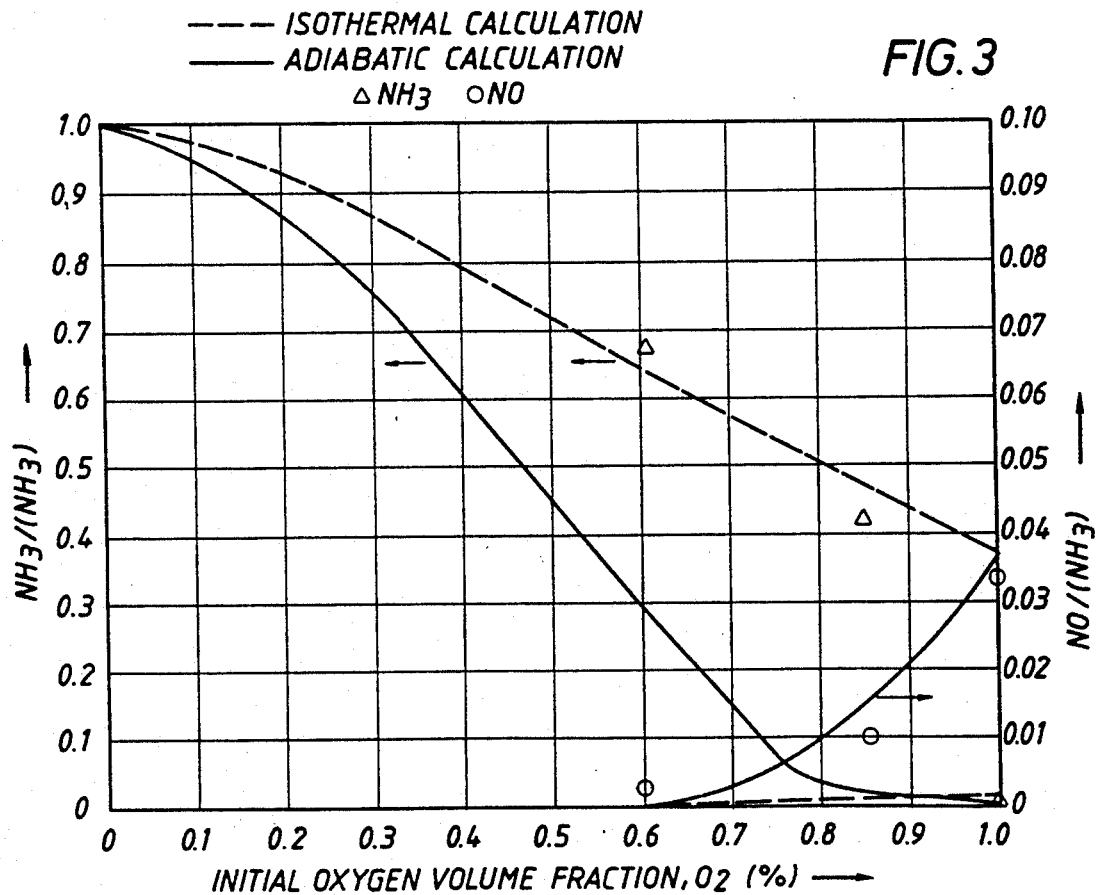
FIG. 3 is a graph showing the reduction in $NH_3$ based on the concentration of oxygen added at the initial temperature of 1396° F.

The results of this experiment are shown in FIG. 3. When air addition is zero, the ammonia exit concentration is the same as the level entering the reactor. $NO_x$ production is zero. As the air flow is increased, the ammonia concentration is drastically diminished and approaches zero at about 1% oxygen at the reactor entrance. As ammonia levels decrease some generation of $NO_x$ begins by means of the oxygen addition. The curves drawn on FIG. 3 represent calculations using kinetics codes for isothermal and adiabatic cases. The quartz reactor falls somewhere between these thermal extremes. FIG. 3 shows that large amounts of ammonia can be destroyed at the expense of generating small amounts of $NO_x$.

What is claimed is:

1. A process for the reduction in the amount of nitrogen compounds comprising (ammonia) $NH_3$ and (hydrogen cyanide) HCN present in a regeneration off gas stream prior to said stream's passage to a CO boiler having an amount of said nitrogen compounds, wherein the regeneration off gas stream is derived from a regenerator operating in a partial mode of combustion to produce said nitrogen compounds and at least 1% CO in said stream, said process comprises adding an amount of an oxygen-containing gas consisting essentially of air or oxygen to said off gas stream to produce a gas stream having a temperature of 1260° F. to 1400° F. for a period of time sufficient to convert said nitrogen compounds to $NO_x$ and $N_2$.

2. The process of claim 1 wherein the amount of ammonia present in the off gas stream is greater than 300 ppm.

3. The process of claim 1 wherein the partial mode of combustion results in the presence of 1% to 6% CO.

4. The process of claim 1 wherein the addition of said oxygen-containing gas results in at least a 50 percent reduction in the quantity of said nitrogen compounds.

5. The process of claim 1 wherein the period of time sufficient to convert said nitrogen compounds to $NO_x$ and nitrogen is equal to 0.1 to about 1.0 seconds.

6. The process of claim 1 wherein said oxygen-containing gas is air and wherein said air is heated prior to addition to the off gas stream.

7. In a process for the regeneration of a catalytic cracking catalyst in a regeneration zone operated at regeneration conditions sufficient to result in 1] a partial mode of regeneration defined by a CO content greater than 1% CO and 2] a quantity of nitrogen compounds including $NH_3$ and HCN, the improvement which comprises adding an amount of an oxygen-containing gas consisting essentially of air or oxygen to said off gas to produce an off gas stream having a temperature of about 1260° F. to about 1400° F. sufficient to convert said nitrogen compounds to $NO_x$ and $N_2$.

8. The process of claim 7 wherein said oxygen-containing gas is preheated prior to addition to said off gas stream.

9. The process of claim 7 wherein said addition of said oxygen-containing gas reduces the quantity of $NH_3$ and HCN by as much as 50 percent.

* * * * *

UNITED STATES PATENT AND TRADEMARK OFFICE
CERTIFICATE OF CORRECTION

PATENT NO. : 5,240,690
DATED : August 31, 1993
INVENTOR(S) : Harry S. Tang et al It is certified that error appears in the above-indentified patent and that said Letters Patent is hereby corrected as shown below:

On the title page, Item [54]; Title of the Invention should read as follows:

METHOD OF REMOVING $NH_3$ AND HCN FROM AN FCC REGENERATOR OFF GAS

Signed and Sealed this

Twenty-ninth Day of March, 1994

Attest:

BRUCE LEHMAN

Attesting Officer          Commissioner of Patents and Trademarks